Dec. 4, 1956  H. R. CLECKNER  2,772,867
AERATOR
Filed Feb. 11, 1953  2 Sheets-Sheet 1
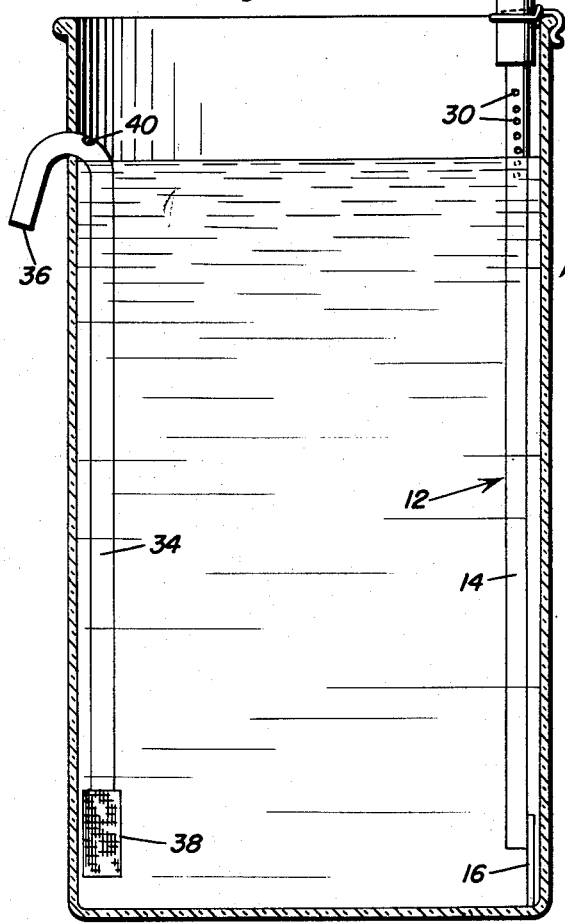
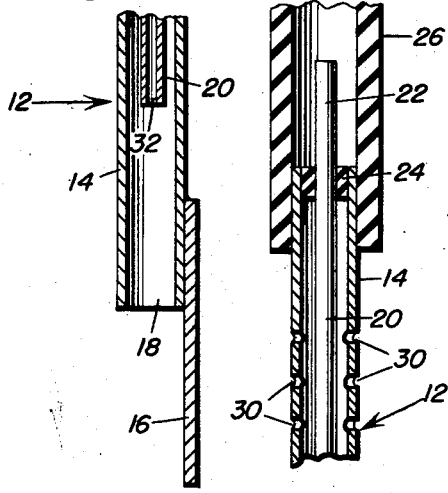
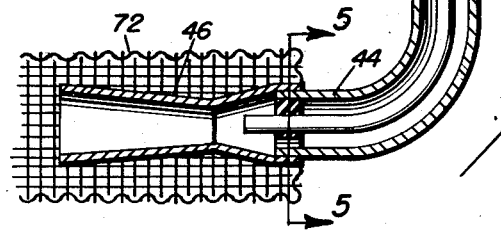
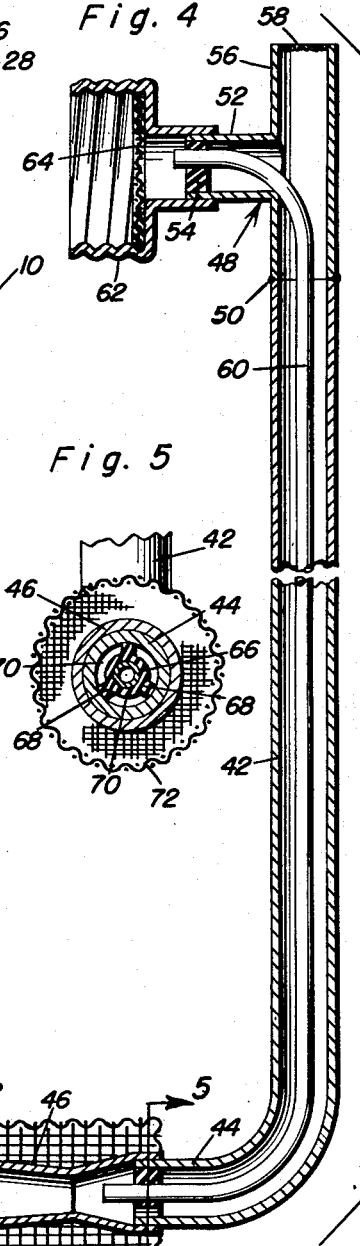
Howard R. Cleckner
INVENTOR.
BY *James A. O'Brien*
and *Harvey B. Jackson*
Attorneys Dec. 4, 1956

H. R. CLECKNER 2,772,867

AERATOR

Filed Feb. 11, 1953

Howard R. Cleckner
INVENTOR.

BY *Clarence A. O'Brien
and Harvey B. Jacobson*
Attorneys

United States Patent Office 2,772,867
Patented Dec. 4, 1956

2,772,867
AERATOR

Howard R. Cleckner, Tipp City, Ohio

Application February 11, 1953, Serial No. 336,420

2 Claims. (Cl. 261—77)

This invention relates to new and useful improvements in fish or bait tanks and the like, and relates more particularly to an improved means for conditioning water within such tanks so as to maintain a sufficient amount of entrained air in the water to properly support marine life.

An object of this invention is the provision of a device which will introduce air and water into tanks simultaneously aerating the water therein and agitating the same to aid in the removal of carbon dioxide.

Another object of this invention is to provide an aerator which utilizes water under pressure as a means for conditioning the water.

Another object of this invention is to provide means for conditioning water which incorporates first and second conduits, one of which is connected to a suitable source of water and which discharges into the other effecting entrapping and entraining of air therein.

Another object of this invention is to provide an aerator which utilizes a convenient source of water pressure such as a garden hose, a faucet or the like.

Another object of this invention is to provide an aerator which is simple and economical in construction and yet which is fully effective to produce the desired results.

These together with other objects and advantages which will become subsequently apparent reside in the details of construction and operation as more fully hereinafter described and claimed, reference being had to the accompanying drawings forming a part hereof, wherein like reference numerals refer to like parts throughout, and in which:

Figure 1 is a vertical section taken through an aquarium, fish tank or the like showing the novel aerator mounted therein;

Figure 2 is an enlarged vertical section taken through the upper end of the aerator;

Figure 3 is another enlarged vertical section taken through the lower end of the aerator;

Figure 4 is an enlarged vertical section taken through a modified form of aerator and showing details of its internal construction;

Figure 5 is a vertical section taken substantially along the plane of section line 5—5 of Figure 4 and showing the lower end construction of the aerator;

Figure 9:
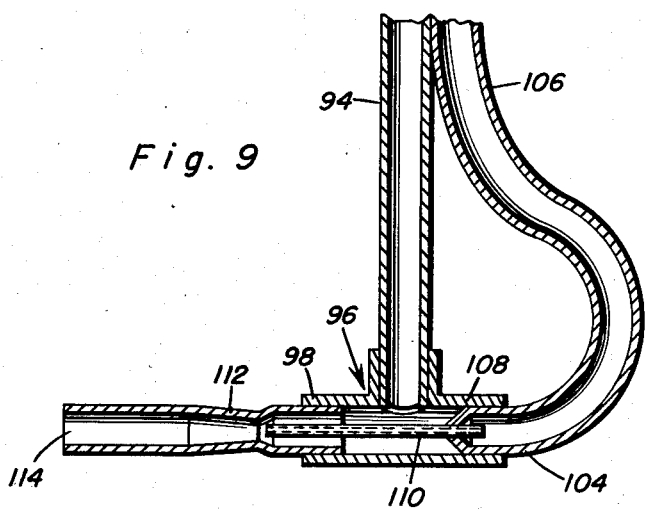
Figures 7, 8 and 9 are enlarged vertical sections taken through the lower ends of still further modified forms of the aerator.

Referring now more particularly to Figure 1, reference numeral 10 indicates generally an aquarium, fish or bait tank or the like which is partially filled with water within which any desired type of marine life may live.

Since fish or other marine life rely upon air entrained or entrapped within the water for a source of oxygen, the water in which they live must either be constantly changed to maintain an adequate supply of oxygen or frequently conditioned to furnish this supply. Ordinary tap water contains very little entrained air and, therefore, must be frequently changed to supply the correct amount, it being possible to constantly introduce a fresh supply of such water into the receptacle within which the marine life lives with the ensuing obviously wasteful result. This invention contemplates the use of a novel aerator which will entrap or entrain a sufficient amount of air within ordinary tap water so that periodic introduction of the same into the receptacle containing the marine life will be sufficient to maintain a proper supply of air within the receptacle.

With further reference to Figures 2 and 3, in addition to Figure 1, reference numeral 12 indicates generally an air conduit which comprises a vertical tube 14 whose lower end, Figure 3, is provided with a rod-like extension 16 secured thereto to maintain the open end 18 thereof in spaced relation with respect to the bottom of the fish tank or other receptacle within which the aerator is to be used. A second or water conduit 20, preferably of tubular configuration, is disposed concentrically within the first conduit and its upper end 22, Figure 2, extends outwardly of the first conduit. Adjacent the upper end of tube 14 is an annular washer or seal 24 through which the water conduit 20 extends and this seal not only prevents water from being discharged into the upper end of the tube 14, but also maintains the tube 20 in proper concentric relation within the first conduit. This seal may be formed of rubber or other resilient material to provide an effective seal.

The upper end of the first conduit also carries one end of a resilient tube or hose 26 which is frictionally engaged thereon, and the other end of which is adapted to be inserted over a faucet or other water outlet opening so as to supply water under pressure to the inner or second conduit 20. A wire hook or the like 28 may be provided on the hose for maintaining the aerator in proper position on the tank or receptacle.

The upper wall of the air conduit 14 is provided with a plurality of air intake apertures 30 and it will be readily apparent that when tap water is discharged through the free end opening 32 of the water conduit, a portion of its kinetic energy will be converted within the lower end of the air conduit to draw air downwardly through the openings 30 to be mixed with the discharged tap water and entrained therein so that the lower end opening 18 of the air conduit presents a discharge opening for aerated water and free air bubbles.

To maintain a constant level of water within the fish tank or other receptacle within which the aerator is to be used, a discharge tube 34 is disposed within the tank, and its upper free end is provided with a discharge opening, as at 36, while the lower end thereof may be provided with a filter screen 38. A vent opening 40 is provided adjacent the looped upper end of the discharge tube to prevent siphoning action by the discharge tube.

In Figures 4 and 5, there is shown a modified form of aerator in which the air conduit comprises a vertical tube 42 having a right angular lower end 44 which terminates in a venturi tube 46 secured thereto. A T-shaped coupling member 48 is suitably secured, as at 50, to the upper end of the vertical tube 42 and the horizontal branch 52 thereof is provided with a resilient seal 54 similar to the previously described seal 24. The upper branch 56 of the coupling presents an air intake opening which may be conveniently covered by a filtering screen 58 if so desired. Water conduit 60 extends through the seal 54 and concentrically within the air conduit and in order to supply water under pressure thereto, a female coupling member 62 is secured to the free end of horizontal branch 52, a screen element 64 being conveniently placed therein for the purpose of filtering the tap water.

The lower end of the water tube is provided with an annular ring 66 having radially extending fingers 68 thereon which present openings 70 for the free passage of air therethrough, the ring and fingers serving to support the free lower end of the water conduit. When water is discharged therefrom into the throat of venturi tube 46, the ensuing conversion of energy will draw air down through the air tube to be mixed and entrained within the water so that the free end of the venturi tube presents a discharge opening for aerated water.

The lower end of the air conduit may be provided with a cylindrical screening member 72 for the purpose of preventing foreign material from entering the bait tank and for breaking up larger bubbles of air in the discharged water.

Figure 6:
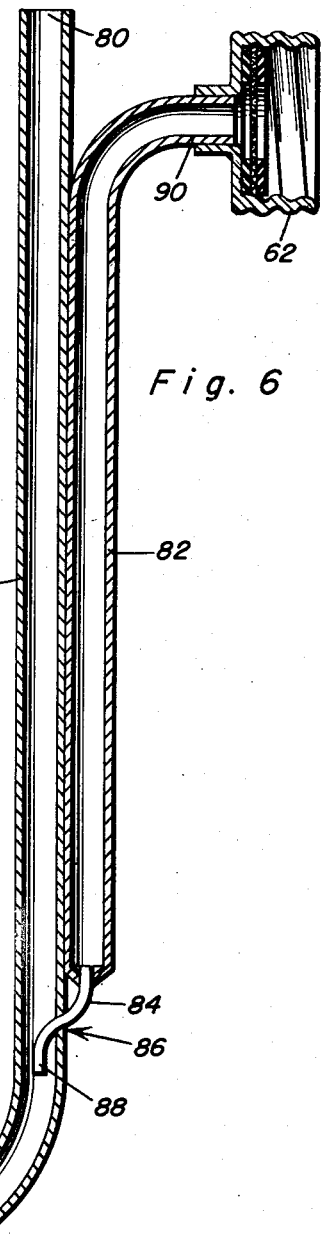
Figure 6 is an enlarged vertical section taken through a still further modified form of aerator.

Figure 6 shows a further modification of the aerator in which the same principles as set forth above are involved, but in which the specific disposition of elements differs from the devices previously described. In this form, the air conduit comprises a vertical tubular portion 74 having a lower right angular portion 76 presenting a discharge opening 78 for the aerated water, the upper end opening 80 being provided, of course, for the reception of intake air. The water conduit 82 is secured in juxtaposed relation to the air conduit and is provided at its lower end with a substantially S-shaped tubular member 84 which extends through the wall of the air conduit, as at 86, to present a water discharge end 88 within the air conduit. The upper end of conduit 82 is provided with a laterally offset portion 90 which has secured at its free end a female coupling element 62, as previously set forth. The operation of this modification is identical to that previously described, the tap water being discharged from the tubular member 84 within the air conduit to thereby entrain air therein so that aerated water will be discharged out of the opening 78.

Figure 7:
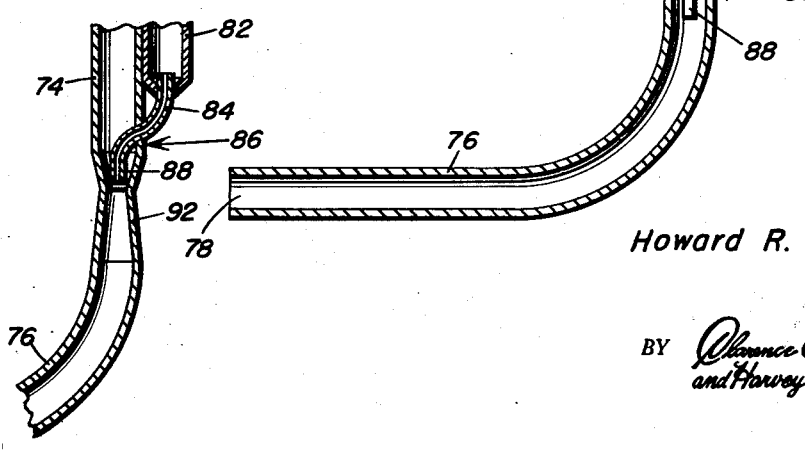

Figure 7 is a modification of the device shown in Figure 6 in that the lower end portion of the air conduit is deformed to present a venturi tube 92 into the throat of which the S-shaped tube 84 discharges.

Figure 8:
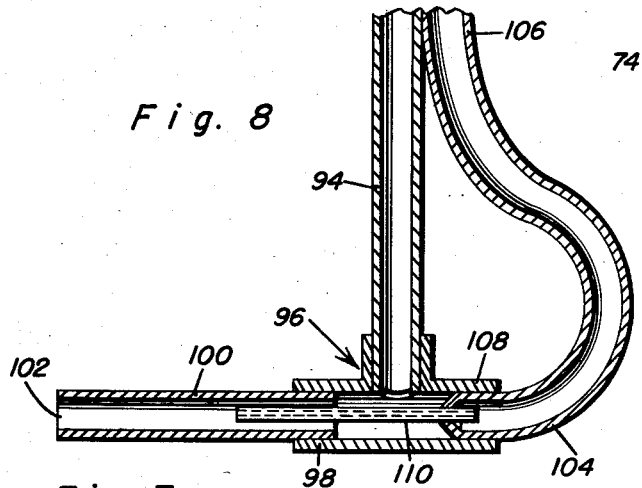

In Figure 8, a further modification of the general structure shown in Figure 6 is shown in which the air conduit comprises a vertical tube 94 having its lower end formed as a T-shaped coupling element 96, one horizontal branch 98 of which carries a horizontal tube 100 presenting a discharge opening 102 for aerated water. The lower end 104 of water conduit 106 is received in the other horizontal branch 108 and is provided with a discharge tube 110 which extends to a point within the horizontal tube 100.

In Figure 9, the construction is identical to the form shown in Figure 8 with the exception that the horizontal tube is shaped in the form of a venturi 112 into the throat of which the horizontal discharge tube 110 discharges. The venturi member is, of course, provided at its free end with an opening 114 for the discharge of aerated water.

The forms of the invention shown in Figures 4–9 are particularly adapted for use out of doors wherein the female coupling member 62 presents a convenient means for the attachment of a garden hose, the form shown in Figure 1 being more particularly adapted for use indoors wherein the hose 26 may be slipped over the end of a faucet or the like. In all of the forms, the operation is essentially the same, that is, the kinetic energy of a moving mass of water being utilized to entrap and entrain air therein to condition the same prior to its discharge within the confines of a receptacle to be used for maintaining marine life therein.

It will be noted that the agitating effect of free air escaping to the surface of the water expedites the process of removing carbon dioxide which normally takes place only at the surface. By discharging aerated water and free air near the bottom of the tank, the removal takes place not only at the surface but throughout the entire tank.

In many places it may be advantageous to use a small circulating pump to move the water from the tank, through the aerator, and back into the tank, forming a closed system. This system is desirable in those instances where tap water would be too cold to support the marine life under consideration.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An aerator for a fish tank having water maintained at a predetermined level and comprising a hollow T member positioned adjacent the bottom of said tank, a vertical air conduit extending from the center connection of said T member to the atmosphere, a venturi element extending from one of the end connections of said T member, a water supply pipe having one end connected to the other of said T member end connections, said water supply pipe end tapering inwardly, and a discharge tube smaller in diameter than said water supply pipe connected to the tapered end of said water supply pipe and extending through said T member into proximity with the throat of said venturi, said venturi being adjacent the bottom of said tank and positioned to direct a jet of water and air parallel to said tank bottom to agitate the water and to remove carbon dioxide therefrom throughout the entire tank.

2. An aerator for a fish tank having water maintained at a predetermined level and comprising a hollow T member positioned adjacent the bottom of said tank, a vertical air conduit extending from the center connection of said T member to the atmosphere, a venturi element extending from one of the end connections of said T member, a water supply pipe connected to the other of said T member end connections and a discharge tube having a smaller diameter than said water supply pipe connected to said water supply pipe and extending through said T member beyond said air conduit connection and into the throat of said venturi tube for supplying a jet of water thereto when said water pipe is placed under pressure to draw air from said air conduit to mix with said water, said venturi element positioned parallel to the bottom of said tank to direct a jet of air and water parallel to said tank bottom to agitate the water therein to remove carbon dioxide therefrom throughout the entire tank.

References Cited in the file of this patent

UNITED STATES PATENTS

| | | |
|---|---|---|
| 1,199,380 | Hiller | Sept. 26, 1916 |
| 2,241,337 | Work | May 6, 1941 |
| 2,413,102 | Ebert et al. | Dec. 24, 1946 |
| 2,465,866 | Gaines | Mar. 29, 1949 |
| 2,645,116 | Baxter | July 14, 1953 |

FOREIGN PATENTS

| | | |
|---|---|---|
| 364,155 | Germany | Nov. 17, 1922 |